(12) United States Patent
Matsubara et al.

(10) Patent No.: US 9,416,870 B2
(45) Date of Patent: Aug. 16, 2016

(54) VEHICLE CONTROL APPARATUS

(75) Inventors: Masato Matsubara, Toyota (JP);
Masato Tateno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 59 days.

(21) Appl. No.: 14/352,000

(22) PCT Filed: Oct. 19, 2011

(86) PCT No.: PCT/JP2011/074028
§ 371 (c)(1),
(2), (4) Date: Apr. 15, 2014

(87) PCT Pub. No.: WO2013/057800
PCT Pub. Date: Apr. 25, 2013

(65) Prior Publication Data
US 2014/0303861 A1 Oct. 9, 2014

(51) Int. Cl.
*F16H 61/12* (2010.01)
*B60R 16/023* (2006.01)

(52) U.S. Cl.
CPC ............ *F16H 61/12* (2013.01); *B60R 16/0236* (2013.01); *F16H 2061/1268* (2013.01)

(58) Field of Classification Search
None
See application file for complete search history.

(56) References Cited

U.S. PATENT DOCUMENTS

| 6,356,821 | B1 | 3/2002 | Yoshida |
| RE40,615 | E * | 1/2009 | Burgbacher et al. ............ 74/335 |
| 2009/0288903 | A1 * | 11/2009 | Musmaker et al. ........... 180/336 |
| 2010/0228455 | A1 * | 9/2010 | Katrak et al. ................... 701/58 |

FOREIGN PATENT DOCUMENTS

| JP | A-6-274361 | 9/1994 |
| JP | A-2001-63492 | 3/2001 |
| JP | 2011-126327 A | 6/2011 |

* cited by examiner

*Primary Examiner* — Edwin A Young
(74) *Attorney, Agent, or Firm* — Oliff PLC

(57) ABSTRACT

A vehicle control device includes: a first calculation processing portion outputting a calculation result based on an input value; and a second calculation processing portion acquiring the same input value as the input value of the first calculation processing portion, the second calculation processing portion detecting an abnormality of the first calculation processing portion based on comparison between the input value of the second calculation processing portion and the calculation result of the first calculation processing portion or based on whether the calculation result is a predefined highly safe state value at which a relatively high safety state of a vehicle is acquired.

7 Claims, 6 Drawing Sheets

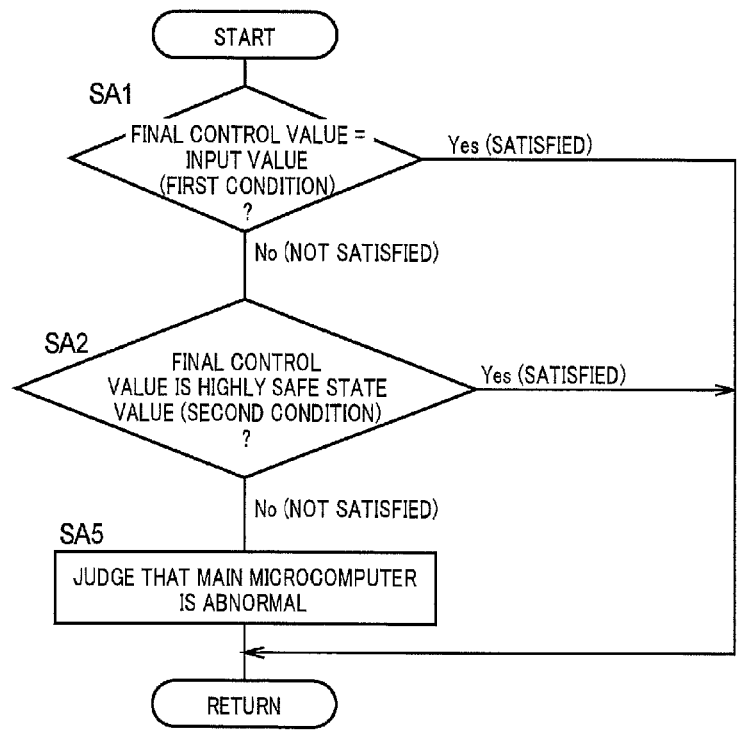
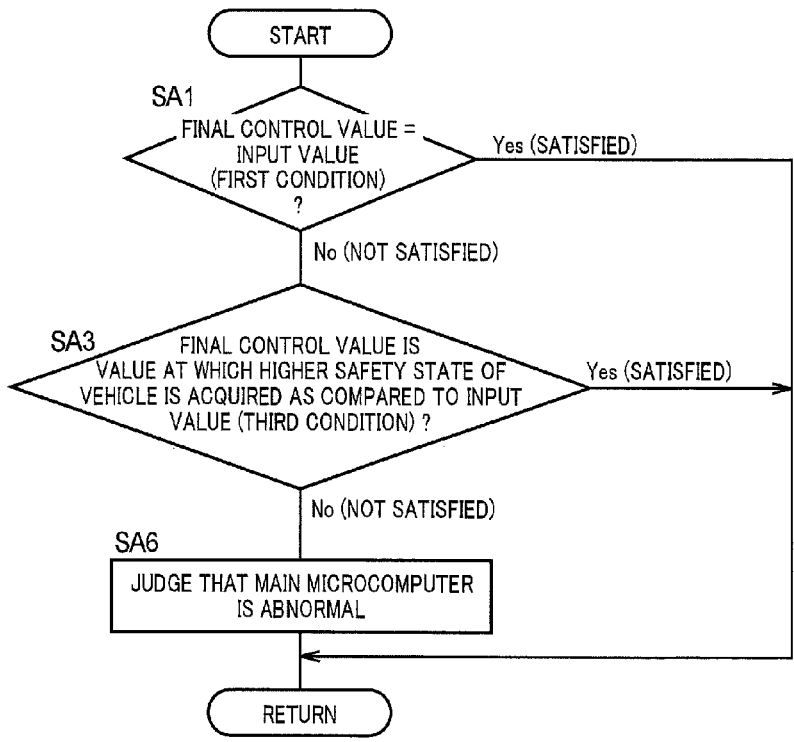

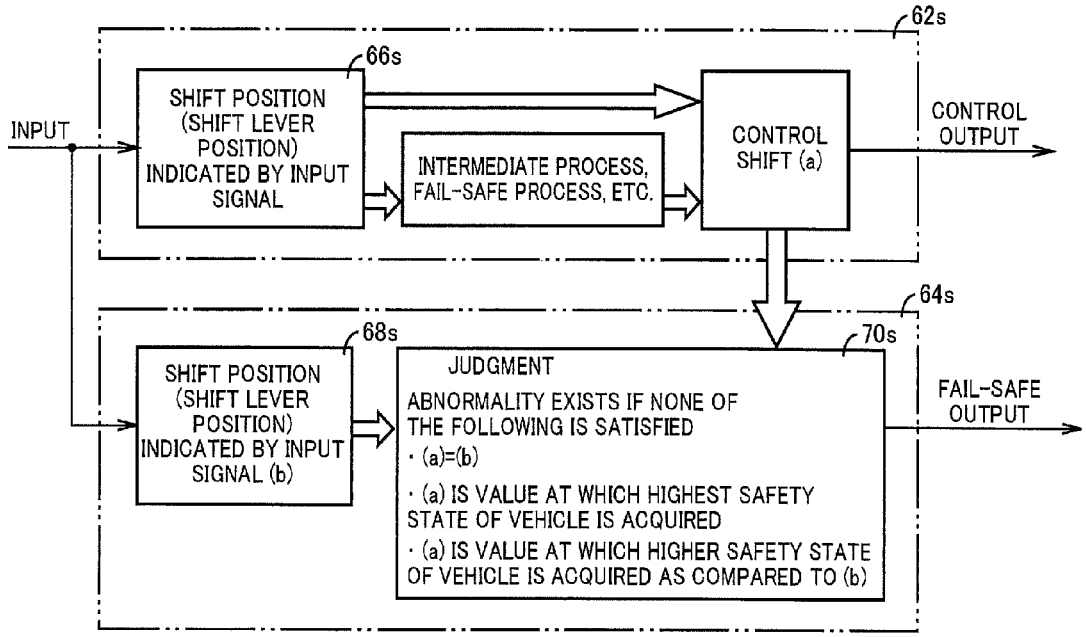

U S 9,416,870 B2

VEHICLE CONTROL APPARATUS

TECHNICAL FIELD

The present invention relates to a technique of achieving cost reduction of a vehicle control device.

BACKGROUND ART

A vehicle control device including a first calculation processing portion and a second calculation processing portion is conventionally well known. For example, this corresponds to a vehicle computer system disclosed in Patent Document 1. In the vehicle computer system of Patent Document 1, the first calculation processing portion and the second calculation processing portion have the same configuration and execute the same calculation process. The vehicle computer system compares certain data of the first calculation processing portion and the second calculation processing portion in a calculation process step with each other to detect an abnormality.

PRIOR ART DOCUMENTS

Patent Documents

Patent Document 1: Japanese Laid-Open Patent Publication No. 6-274361
Patent Document 2: Japanese Laid-Open Patent Publication No. 2001-063492

SUMMARY OF THE INVENTION

Problems to Be Solved by the Invention

As described in Patent Document 1, if one vehicle control device is disposed with two calculation processing portions having the same configuration and executing the same calculation process, detection of abnormality is certainly facilitated and the reliability of calculation result is improved. However, in a vehicle control device having one calculation processing portion as a monitoring object monitored by the other calculation processing portion (a monitoring portion), if the monitoring portion has the same configuration as the monitoring object as in Patent Document 1, a scale is increased not only in the monitoring object but also in the monitoring portion as the calculation performed by the monitoring object becomes complicated, causing a problem of significant increase in cost of the monitoring portion. For example, one calculation frequently performed in the vehicle control device is a fail-safe calculation. Since every vehicle situation is considered in this fail-safe calculation, the logic and the necessary input of the calculation become complicated. When the monitoring object performs the fail-safe calculation, if the monitoring portion is caused to perform the same fail-safe calculation, the monitoring portion requires a large amount of ROMs etc., as well as the monitoring object and is increased in scale, which leads to higher cost of the monitoring portion. Such a problem is unknown.

The present invention was conceived in view of the situations and it is therefore an object of the present invention to provide a vehicle control device capable of suppressing a cost increase while ensuring reliability of a calculation result of a calculation processing portion.

Means for Solving the Problem

To achieve the object, the first aspect of the invention provides a vehicle control device (a) comprising: a first calculation processing portion outputting a calculation result based on an input value; and a second calculation processing portion acquiring the same input value as the input value of the first calculation processing portion, (b) the second calculation processing portion detecting an abnormality of the first calculation processing portion based on comparison between the input value of the second calculation processing portion and the calculation result of the first calculation processing portion or based on whether the calculation result is a predefined highly safe state value at which a relatively high safety state of a vehicle is acquired.

Effects of the Invention

Consequently, since the second calculation processing portion does not need to have the same configuration as the first calculation processing portion for ensuring the reliability of the calculation result of the first calculation processing portion, the cost increase of the vehicle control device can be suppressed while the reliability of the calculation result of the first calculation processing portion is ensured even if the first calculation processing portion has a large-scale configuration.

The second aspect of the invention provides the vehicle control device recited in the first aspect of the invention, wherein the second calculation processing portion judges that the first calculation processing portion is abnormal if no condition is satisfied out of a condition that the calculation result of the first calculation processing portion is equal to the input value of the second calculation processing portion, a condition that the calculation result of the first calculation processing portion is the highly safe state value, and a condition that the calculation result of the first calculation processing portion is a value at which a higher safety state of the vehicle is acquired as compared to the input value of the second calculation processing portion. Consequently, it can be determined whether the first calculation processing portion is abnormal, under specific judgment criteria.

The third aspect of the invention provides the vehicle control device recited in the second aspect of the invention, wherein (a) the vehicle control device further comprises a shift operation device outputting a shift position selected by a driver as an electric signal to the first calculation processing portion and the second calculation processing portion, wherein (b) the input value of the first calculation processing portion and the second calculation processing portion is the shift position selected in the shift operation device, and wherein (c) the calculation result of the first calculation processing portion is set to any of the shift positions selectable in the shift operation device. Consequently, the cost increase of the vehicle control device providing shift control can be suppressed while preventing the impairment of the reliability of the calculation result of the first calculation processing portion, i.e., the reliability of the shift control, in the shift control of recognizing the shift position based on the electric signal from the shift operation device and providing shift control etc.

The fourth aspect of the invention provides the vehicle control device recited in the third aspect of the invention, wherein (a) any of the shift positions is selected in the shift operation device from a parking position at which power transmission to drive wheels is interrupted while the drive wheels are fixed, a neutral position at which the power transmission to the drive wheels is interrupted while the drive wheels are allowed to rotate, and a running position at which the vehicle is allowed to run forward or backward, wherein (b) the highly safe state value is predefined as the parking position, and wherein (c) the neutral position is predefined as a position at which a higher safety state of the vehicle is acquired as compared to the running position. Consequently, since the relationship between the height of the safety state of the vehicle and the shift position is predefined, the second calculation processing portion can easily determine whether the first calculation processing portion is abnormal.

Preferably, in the vehicle control device recited in the first aspect of the invention, the second calculation processing portion judges that the first calculation processing portion is abnormal if two conditions i.e., a condition that the calculation result of the first calculation processing portion is equal to the input value of the second calculation processing portion and a condition that the calculation result of the first calculation processing portion is the highly safe state value are not satisfied.

Preferably, in the vehicle control device recited in the first aspect of the invention, the second calculation processing portion judges that the first calculation processing portion is abnormal if two conditions i.e., a condition that the calculation result of the first calculation processing portion is equal to the input value of the second calculation processing portion and a condition that the calculation result of the first calculation processing portion is a value at which a higher safety state of the vehicle is acquired as compared to the input value of the second calculation processing portion are not satisfied.

Preferably, in the vehicle control device recited in the first aspect of the invention, the second calculation processing portion judges that the first calculation processing portion is abnormal if two conditions i.e., a condition that the calculation result of the first calculation processing portion is the highly safe state value and a condition that the calculation result of the first calculation processing portion is a value at which a higher safety state of the vehicle is acquired as compared to the input value of the second calculation processing portion are not satisfied.

Preferably, in the vehicle control device recited in the first aspect of the invention, the second calculation processing portion judges that the first calculation processing portion is abnormal if a condition that the calculation result of the first calculation processing portion is the highly safe state value is not satisfied.

BRIEF DESCRIPTION OF THE DRAWINGS

FIG. 5 is a flowchart for explaining the major control operation provided by the abnormality detection control portion included in the monitoring microcomputer of FIG. 3 and the flowchart being a case where a second determination pattern is employed out of determination patterns used for detecting an abnormality of a main microcomputer by the abnormality detection control portion.

FIG. 6 is a flowchart for explaining the major control operation provided by the abnormality detection control portion included in the monitoring microcomputer of FIG. 3 and the flowchart being a case where a third determination pattern is employed out of determination patterns used for detecting an abnormality of a main microcomputer by the abnormality detection control portion.

FIG. 9 is a functional block diagram corresponding to FIG. 3 and is a functional block diagram of a main portion of the configuration in the electronic control device for providing the shift control.

FIG. 10 is an example of a vehicle safety state map in which the relationship between the height of the safety state of the vehicle and the shift position is predefined in shift control using a calculation result of a main microcomputer of FIG. 9.

FIG. 11 is a table of a relationship of the input value of the monitoring microcomputer, a control shift of the main microcomputer, and satisfaction of first to third conditions depicted in FIG. 4 in abnormality detection control provided by a monitoring microcomputer of FIG. 9.

MODE FOR CARRYING OUT THE INVENTION

An example of the present invention will now be described in detail with reference to the drawings.

EXAMPLE

Figure 1:
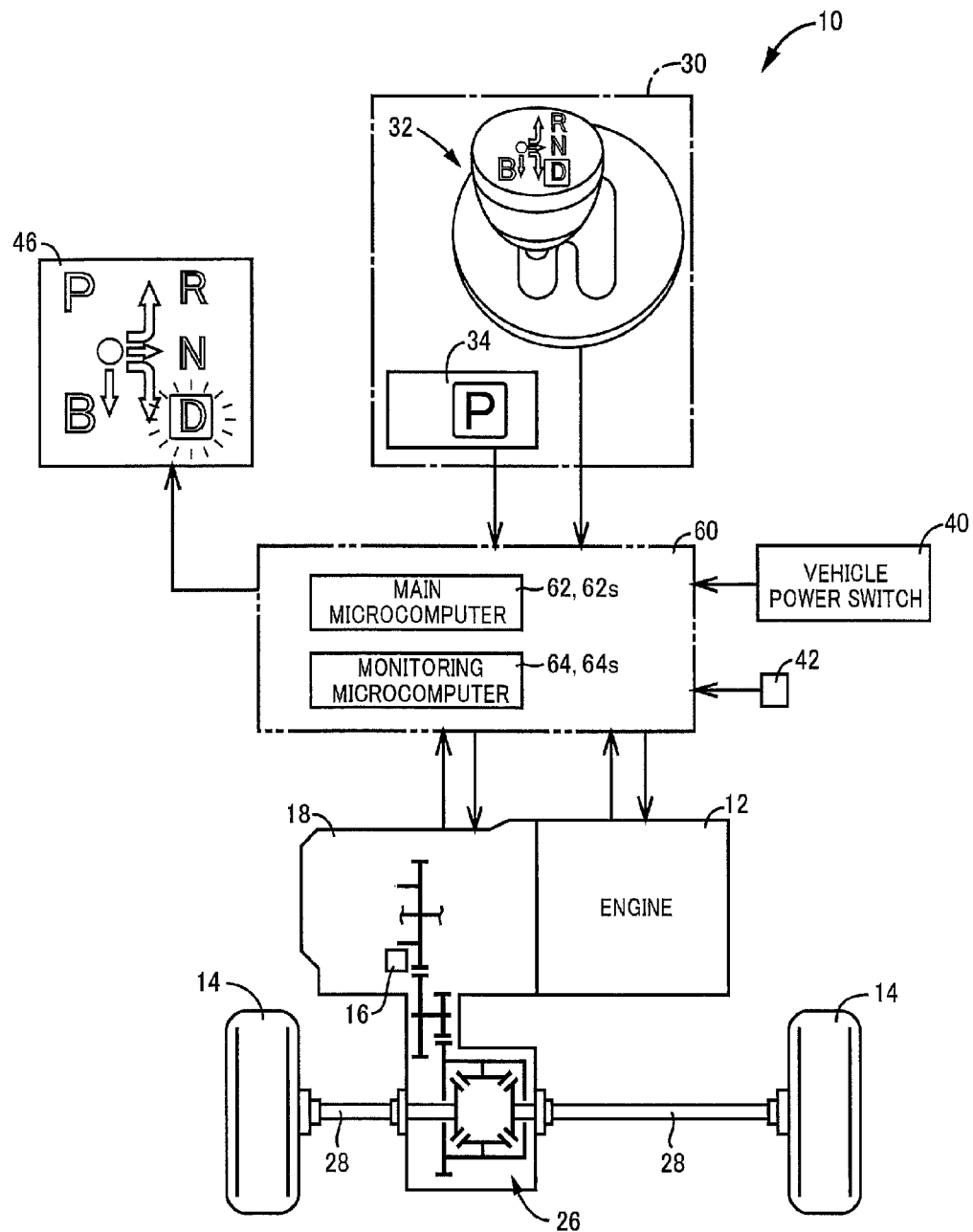
FIG. 1 is a diagram for explaining a general configuration of a vehicle to which the present invention is applied and a block diagram exemplarily illustrating input/output signals of an electronic control device controlling the vehicle.

FIG. 1 is a diagram for explaining a general configuration of a vehicle 10 to which the present invention is applied and a block diagram exemplarily illustrating input/output signals of an electronic control device 60 controlling the vehicle 10. In FIG. 1, the vehicle 10 is an FF (front-engine front-drive) type vehicle and the vehicle 10 includes a parking lock device 16 mechanically blocking rotation of drive wheels 14 during parking, a transmission 18, a shift operation device 30, etc., and employs a shift-by-wire (SBW) mode in which the electronic control device 60 acquires a shift position Psh selected in the shift operation device 30 through an electric signal. The transmission 18 is a stepped automatic transmission typically used in a vehicle and includes a plurality of planetary gear devices and a plurality of hydraulic friction engagement devices, for example. The vehicle 10 causes power of an engine 12 that is an internal combustion engine acting as a drive force source for running to be transmitted sequentially via the transmission 18, a differential gear device (differential gear) 26, a pair of axles (drive shafts) 28, etc., to a pair of the drive wheels 14. Although the vehicle 10 of FIG. 1 has only the engine 12 as the drive force source for running, the vehicle 10 may be a hybrid vehicle or an electric vehicle.

The vehicle 10 includes the electronic control device 60 acting as a vehicle control device providing various controls of the vehicle 10. The electronic control device 60 includes a so-called microcomputer including, for example, a CPU, a RAM, a ROM, and an input/output interface. The electronic control device 60 executes signal processes in accordance with programs stored in advance in the ROM etc. to provide an output control of the engine 12, a shift control of the transmission 18, a control related to the shift-by-wire mode, a switching control of an operation state of the parking lock device 16, etc.

The electronic control device 60 is supplied with, for example, shift lever position signals corresponding to an operation position Pope from a shift sensor 36 and a select sensor 38 (see FIG. 2) that are position sensors for detecting the operation position Pope of a shift lever 32, a P-switch signal indicative of a switch operation of a P-switch 34 for switching the shift position Psh selected in the shift operation device 30 from a non-P position other than a parking position (P-position) to the P-position, a power switch signal indicative of a switch operation of a vehicle power switch 40 for switching a switching state of power supply of the vehicle 10 in accordance with operation by a user (driver), a signal indicative of a vehicle speed V from a vehicle speed sensor 42.

The electronic control device 60 outputs signals for controlling the engine 12 and the transmission 18, for example.

Figure 2:
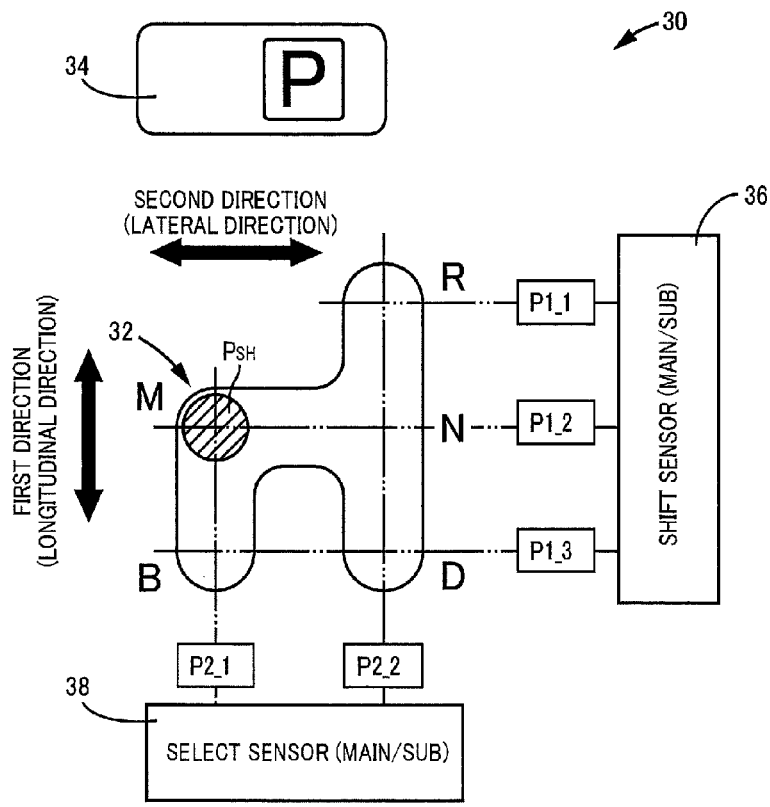
FIG. 2 is a diagram of an example of the shift operation device disposed in the vehicle of FIG. 1.

FIG. 2 is a diagram of an example of the shift operation device 30 acting as a switching device (operation device) switching a plurality of types of the shift positions Psh through artificial operation. The shift operation device 30 includes the shift lever 32 disposed near a driver's seat, for example, and acting as a momentary operator operated to any of the multiple operation positions Pope, i.e., an automatically returning operator automatically returning to an original position (initial position) when an operation force is canceled. The shift operation device 30 of this example includes the P-switch 34 operated when a driver selects the parking position (P-position) as another switch near the shift lever 32.

The shift lever 32 is operated to each of the three operation positions Pope arranged in a front-back direction or up-down direction, i.e., a longitudinal direction, of the vehicle 10 as depicted in FIG. 2, which are an R-operation position (corresponding to an R-position), an N-operation position (corresponding to an N-position), and a D-operation position (corresponding to a D-position), as well as an M-operation position and a B-operation position (corresponding to a B-position) arranged in parallel therewith. The shift operation device 30 has the R-position selected as the shift position Psh when the shift lever 32 is shift-operated to the R-operation position by a driver, the N-position selected as the shift position Psh when the shift lever 32 is shift-operated to the N-operation position, the D-position selected as the shift position Psh when the shift lever 32 is shift-operated to the D-operation position, and the B-position selected as the shift position Psh when the shift lever 32 is shift-operated to the B-operation position. If the shift lever 32 is operated by a driver, the shift operation device 30 outputs the shift position Psh of the shift operation device 30 selected by the driver as an electric signal (shift lever position signal) to the electronic control device 60. In particular, the shift position Psh is output to a main microcomputer 62s and a monitoring microcomputer 64s (see FIG. 9). The shift lever 32 can be operated in the longitudinal direction between the R-operation position, the N-operation position, and the D-operation position, can be operated in the longitudinal direction between the M-operation position and the B-operation position, and can further be operated in a lateral direction of the vehicle 10 orthogonal to the longitudinal direction between the N-operation position and the B-operation position.

The P-switch 34 is a momentary push-button switch, for example, and outputs the P-switch signal to the electronic control device 60 each time a user (driver) performs a pushing operation. For example, if the shift position Psh is set to the P-position when the parking lock device 16 does not execute a parking lock mechanically blocking the rotation of the drive wheels 14, the driver performs the pushing operation of the P-switch 34. Therefore, if the driver performs the pushing operation of the P-switch 34, the shift operation device 30 outputs the P-position, i.e., the shift position Psh selected by the driver, as an electric signal (P-switch signal) to the electronic control device 60. In particular, the P-position is output to the main microcomputer 62s and the monitoring microcomputer 64s(see FIG. 9). The P-position is a parking position (parking position) at which a power transmission path is interrupted in the transmission 18 while the parking lock device 16 executes the parking lock. In other words, the P-position is the parking position at which a power transmission to the drive wheels 14 is interrupted while the drive wheels 14 are fixed by the parking lock device 16. This parking lock is executed on condition that a predetermined condition is satisfied such as the vehicle speed V equal to or less than a predetermined vehicle speed equivalent to a vehicle stop.

The M-operation position of the shift operation device 30 is the initial position of the shift lever 32 and, even if a lever operation is performed to the operation positions Pope (R-, N-, D-, and B-operation positions) other than the M-operation position, when a driver releases the shift lever 32, i.e., an external force acting on the shift lever 32 disappears, the shift lever 32 returns to the M-operation position due to a mechanical mechanism such as a spring. When each of the shift positions Psh is selected in the shift operation device 30, the electronic control device 60 operates the transmission 18, the parking lock device 16, etc., in accordance with the selected shift position Psh.

Describing the shift positions Psh, the R-position is a running position at which a drive force causing the vehicle 10 to run backward is transmitted to the drive wheels 14, i.e., a backward running position. The N-position (neutral position) is a neutral position achieving a neutral state in which the power transmission path in the transmission 18 is interrupted or, in other words, a neutral position at which the power transmission to the drive wheels 14 is interrupted while the drive wheels 14 are allowed to rotate. The D-position is a running position at which a drive force causing the vehicle 10 to run forward is transmitted to the drive wheels 14, i.e., a forward running position. For example, while the parking lock device 16 executes the parking lock, if the R-position, the N-position, or the D-position is selected in the shift operation device 30, the electronic control device 60 releases the parking lock given that a predetermined condition such as a depressing operation of a brake pedal is satisfied.

The B-position is a running position at which engine brake effect is produced by, for example, the vehicle 10 at the D-position to decelerate the rotation of the drive wheels 14, i.e., a deceleration forward running position (engine brake range). Therefore, the electronic control device 60 disables the selection of the B-position if the shift operation is performed to select the B-position when the current shift position Psh is a shift position Psh other than the D-position, and enables the shift operation selecting the B-position only in the case of the D-position.

Since the shift lever 32 is returned to the M-operation position when the external force acting thereon disappears in the shift operation device 30 of this example, the shift position Psh being selected cannot be recognized by only visually recognizing the operation position Pope of the shift lever 32. Therefore, a shift position display device 46 displaying the shift position Psh being selected is disposed at an easily viewable position for a driver in a vehicle interior.

This example employs a so-called shift-by-wire (SBW) mode and, since the shift operation device 30 is two-dimensionally shift-operated in a first direction P1 that is the longitudinal direction and a second direction P2 that is the lateral direction intersecting with (in FIG. 2, orthogonal to) the direction P1, the shift operation device 30 includes the shift sensor 36 as a first direction detecting portion detecting a shift operation in the first direction P1 and the select sensor 38 as a second direction detecting portion detecting a shift operation in the second direction P2, so as to output the operation position Pope of the shift lever 32 as detection signals of the position sensors to the electronic control device 60. Each of the shift sensor 36 and the select sensor 38 outputs to the electronic control device 60 a detection signal (electric signal) corresponding to the operation position Pope, and the electronic control device 60 recognizes (determines) the operation position Pope of the shift lever 32, i.e., the shift position Psh selected by the shift operation, based on the detection signals.

Describing one example of the detection signals indicative of the operation positions Pope of the shift lever 32, the shift sensor 36 outputs a detection signal corresponding to any of a first-direction first position P1_1 indicative of the R-operation position, a first-direction second position $P1_{13}$ 2. indicative of the M-operation position or the N-operation position, and a first-direction third position P1_3 indicative of the B-operation position or the D-operation position to the electronic control device 60 depending on the shift operation of the shift lever 32. The select sensor 38 outputs a detection signal corresponding to either a second-direction first position P2_1 indicative of the M-operation position or the B-operation position, or a second-direction second position P2_2 indicative of the R-operation position, the N-operation position, or the D-operation position to the electronic control device 60 depending on the shift operation of the shift lever 32. Although one sensor may be disposed for each of the shift sensor 36 and the select sensor 38, two sensors are disposed for each of the sensors in this example in preparation for a failure etc., of the sensors. For example, two sensors acting as the shift sensor 36 are a main shift sensor and a sub-shift sensor outputting the same detection signals to the electronic control device 60, and two sensors acting as the select sensor 38 are a main select sensor and a sub-select sensor outputting the same detection signals to the electronic control device 60.

Figure 3:
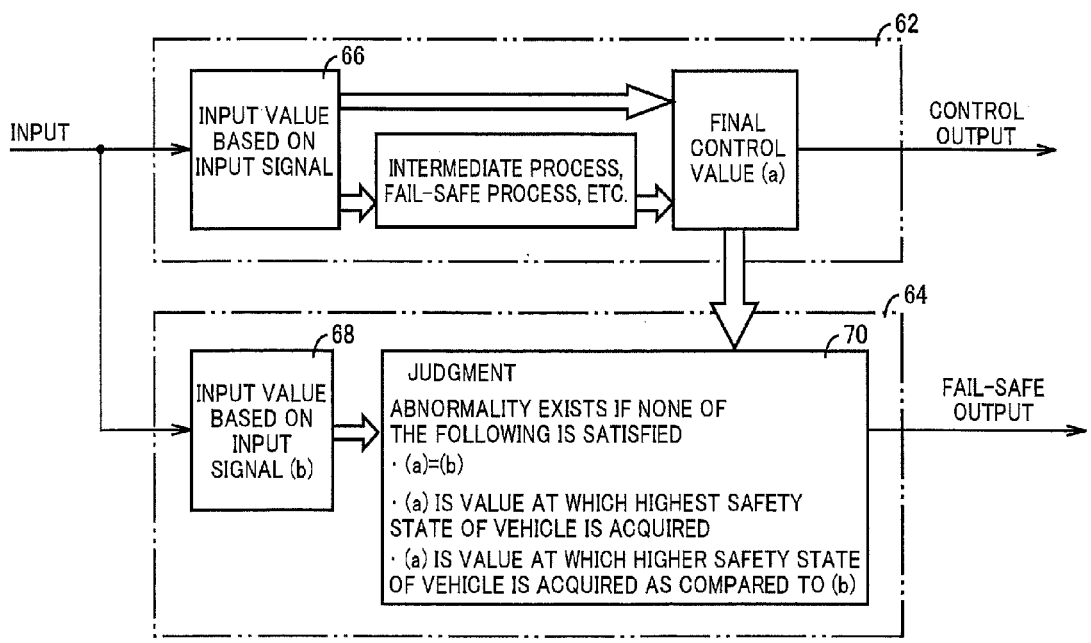
FIG. 3 is a functional block diagram of a generalized main portion of a configuration in the electronic control device for providing one control out of various controls provided in the vehicle of FIG. 1.

FIG. 3 is a functional block diagram of a generalized main portion of a configuration in the electronic control device 60 for providing one control out of various controls provided in the vehicle 10. The various controls are controls related to vehicle running, for example, and the various controls correspond to shift control of recognizing the shift position Psh based on the electric signal from the shift operation device 30, throttle control for opening/closing operation of an electronic throttle valve disposed on the engine 12 based on an electric signal corresponding to an accelerator opening degree Acc, etc. As depicted in FIG. 3, the electronic control device 60 includes a main microcomputer 62 outputting a calculation result for providing the one control in the vehicle 10 and a monitoring microcomputer 64 as a monitoring portion monitoring whether an abnormality exists in the main microcomputer 62 that is a main calculation processing portion as well as a monitoring object. In other words, the main microcomputer 62 is a first calculation processing portion outputting the calculation result based on an input value and the monitoring microcomputer 64 is a second calculation processing portion acquiring the input value same as the input value of the main microcomputer 62 to detect an abnormality in the main microcomputer 62 based on the input value. The main microcomputer 62 functionally includes an input accepting portion 66 accepting input signals (electric signals indicative of pulse interval, voltage, etc.) from detection equipment such as a sensor and the monitoring microcomputer 64 also functionally includes a similar input accepting portion 68. The both input accepting portions 66 and 68 have the same configurations executing the same processes as each other since the main microcomputer 62 and the monitoring microcomputer 64 acquire the same input values as each other. Specifically, the input accepting portions 66 and 68 execute a process of obtaining from the input signal an input value indicated by the input signal. The input value is a control value directly indicated by the input signal input to the input accepting portions 66 and 68. For example, if the calculation result of the main microcomputer 62 is used for the shift control, the input value is the shift position Psh directly indicated by the input signal, and if the calculation result is used for the throttle control, the input value is a magnitude of the accelerator opening degree Acc directly indicated by the input signal from an accelerator opening degree sensor detecting the accelerator opening degree Acc. Taking the shift control as an example, the input accepting portions 66 and 68 obtain from input signals from the shift sensor 36 and the select sensor 38 the shift position Psh indicated by the input signals as the input value.

As depicted in FIG. 3, the main microcomputer 62 determines a final control value that is the calculation result based on the input value acquired by the input accepting portion 66 and outputs the final control value. The final control value is used for providing the one control associated with the main microcomputer 62. The final control value is a value of the same type as, and comparable with, the input value and, for example, if the input value is the accelerator opening degree Acc, the final control value is the accelerator opening degree Acc, or if the input value is the shift position Psh, the final control value is the shift position Psh. Specifically, in the course of obtaining the final control value from the input value, the main microcomputer 62 executes various generally known intermediate processes and a so-called fail-safe process for improving a safety of the vehicle 10 and determines the final control value after these processes. Therefore, if the processes in the main microcomputer 62 are normal, the main microcomputer 62 does not deteriorate (lower) a safety state of the vehicle 10 acquired from the final control value as compared to the safety state of the vehicle 10 acquired from the input value. Although the safety state of the vehicle 10 is a safe vehicle state for an occupant of the vehicle 10 and the safety state of the vehicle 10 widely differs depending on details of control of the main microcomputer 62, for example, if the main microcomputer 62s provides the shift control, the vehicle 10 is in a higher safety state when the vehicle state is closer to a vehicle stop state. The input value varies discretely or continuously within a predefined maximum variation range of the possible input values, and the final control value varies discretely or continuously within the same range as the maximum variation range as is the case with the input value.

The monitoring microcomputer 64 provides abnormality detection control of detecting an abnormality of the main microcomputer 62 based on comparison between an input value of the monitoring microcomputer 64, i.e., an input value acquired by the input accepting portion 68, and a calculation result of the main microcomputer 62, i.e., the final control value, or based on whether the final control value is a predefined highly safe state value. Therefore, the monitoring microcomputer 64 performs fail-safe output indicative of whether the main microcomputer 62 is abnormal. The highly safe state value is predefined depending on specific control of the one control associated with the main microcomputer 62. Defining the highly safe state value, the highly safe state value is a value at which a relatively high safety state of the vehicle 10 can be acquired, for example, a value at which the highest safety state of the vehicle 10 can be acquired within the maximum variation range. If the monitoring microcomputer 64 judges that the main microcomputer 62 is abnormal, for example, the final control value of the main microcomputer 62 is handled as an abnormal value in the one control associated with the main microcomputer 62. The electronic control device 60 then executes a process predefined to be executed when the final control value is an abnormal value in the one control.

Specifically, the monitoring microcomputer 64 functionally includes an abnormality detection control portion 70 for providing the abnormality detection control, and the abnormality detection control portion 70 detects an abnormality of the main microcomputer 62 by using any one of determination patterns depicted in FIGS. 4 to 8 in the abnormality detection control. In other words, the abnormality detection control portion 70 judges whether the main microcomputer 62 is abnormal. Which of the determination patterns depicted in FIGS. 4 to 8 is employed to provide the abnormality detection control is determined depending on specific control of the one control associated with the main microcomputer 62. Each of the control operations depicted in FIGS. 4 to 8 is performed solely or concurrently with another control operation. Common steps in FIGS. 4 to 8 are denoted by the same reference numerals.

Figure 4:
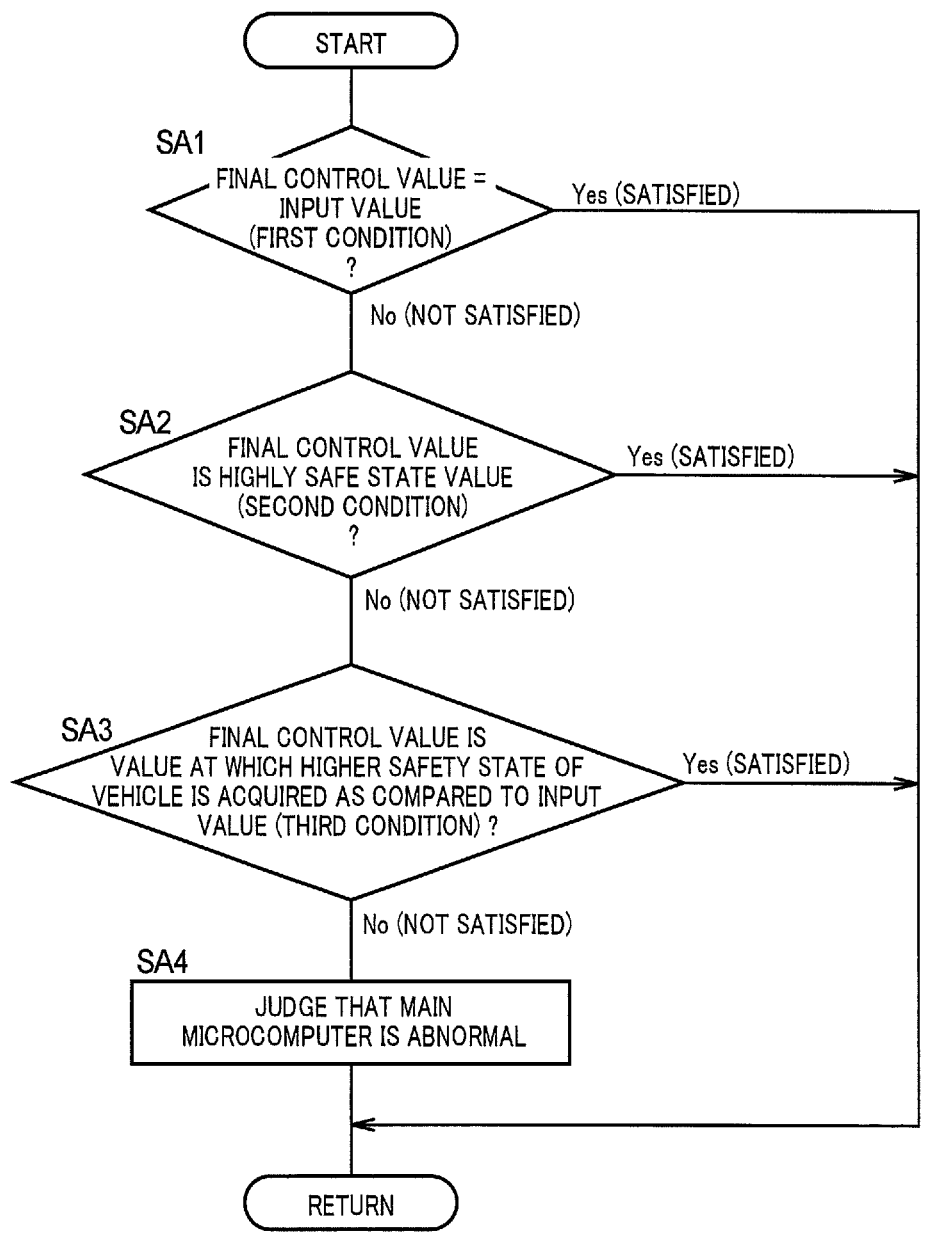
FIG. 4 is a flowchart for explaining a major control operation provided by an abnormality detection control portion included in a monitoring microcomputer of FIG. 3 and the flowchart being a case where a first determination pattern is employed out of determination patterns used for detecting an abnormality of a main microcomputer by the abnormality detection control portion.

For example, when a first determination pattern depicted in FIG. 4 is employed in the abnormality detection control, as depicted in FIG. 4, the abnormality detection control portion 70 makes a judgment on a first condition that the final control value (calculation result) of the main microcomputer 62 is equal to the input value of the monitoring microcomputer 64 at SA1, makes a judgment on a second condition that the final control value of the main microcomputer 62 is the highly safe state value at SA2, and makes a judgment on a third condition that the final control value of the main microcomputer 62 is a value at which a higher safety state of the vehicle 10 is acquired as compared to the input value of the monitoring microcomputer 64 at SA3. If none of the first to third conditions are satisfied, the abnormality detection control portion 70 judges that the main microcomputer 62 is abnormal at SA4. A height of the safety state of the vehicle 10 acquired from the input value and a height of the safety state of the vehicle 10 acquired from the final control value are preferably predefined.

When a second determination pattern depicted in FIG. 5 is employed in the abnormality detection control, as depicted in FIG. 5, when none of two conditions, i.e., the first and second conditions, are satisfied, the abnormality detection control portion 70 judges that the main microcomputer 62 is abnormal at SA5.

When a third determination pattern depicted in FIG. 6 is employed in the abnormality detection control, as depicted in FIG. 6, when none of two conditions, i.e., the first and third conditions, are satisfied, the abnormality detection control portion 70 judges that the main microcomputer 62 is abnormal at SA6.

Figure 7:
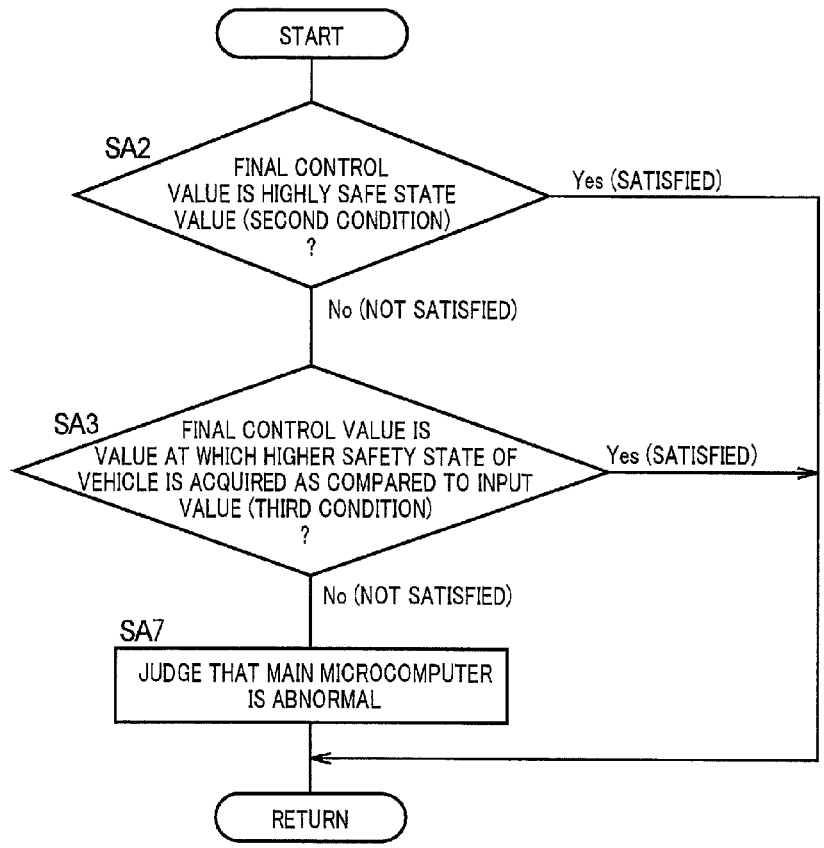
FIG. 7 is a flowchart for explaining the major control operation provided by the abnormality detection control portion included in the monitoring microcomputer of FIG. 3 and the flowchart being a case where a fourth determination pattern is employed out of determination patterns used for detecting an abnormality of a main microcomputer by the abnormality detection control portion.

When a fourth determination pattern depicted in FIG. 7 is employed in the abnormality detection control, as depicted in FIG. 7, when none of two conditions, i.e., the second and third conditions, are satisfied, the abnormality detection control portion 70 judges that the main microcomputer 62 is abnormal at SA7.

Figure 8:
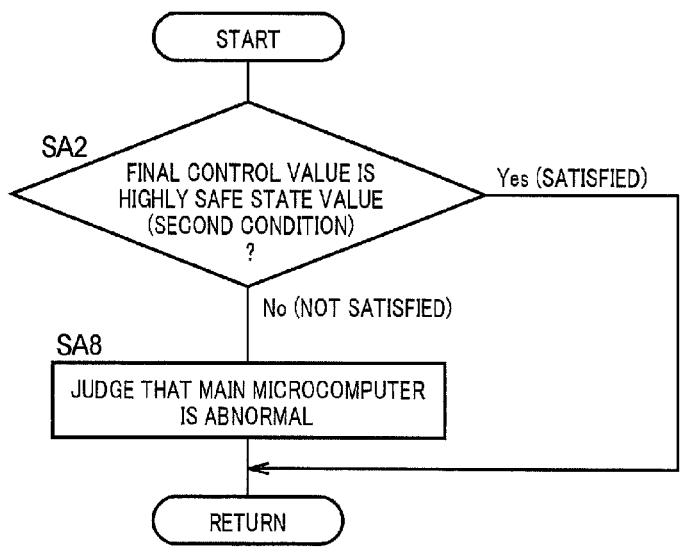
FIG. 8 is a flowchart for explaining the major control operation provided by the abnormality detection control portion included in the monitoring microcomputer of FIG. 3 and the flowchart being a case where a fifth determination pattern is employed out of determination patterns used for detecting an abnormality of a main microcomputer by the abnormality detection control portion.

When a fifth determination pattern depicted in FIG. 8 is employed in the abnormality detection control, as depicted in FIG. 8, when the second condition is not satisfied, the abnormality detection control portion 70 judges that the main microcomputer 62 is abnormal at SA8.

Description will then be made of an example of the case that the one control associated with the main microcomputer 62 of FIG. 3 is specifically the shift control with reference to FIG. 9. FIG. 9 is a functional block diagram corresponding to FIG. 3 and is a functional block diagram of a main portion of the configuration in the electronic control device 60 for providing the shift control. The main microcomputer 62 of FIG. 3 is specifically represented as the main microcomputer 62s in FIG. 9 and the monitoring microcomputer 64 of FIG. 3 is specifically represented as the monitoring microcomputer 64s in FIG. 9. The input accepting portion 66 of the main microcomputer 62 of FIG. 3 is specifically represented as an input accepting portion 66s of the main microcomputer 62s in FIG. 9; the input accepting portion 68 of the monitoring microcomputer 64 of FIG. 3 is specifically represented as an input accepting portion 68s of the monitoring microcomputer 64s in FIG. 9; and the abnormality detection control portion 70 of the monitoring microcomputer 64 of FIG. 3 is specifically represented as an abnormality detection control portion 70s of the monitoring microcomputer 64s in FIG. 9. In other words, the main microcomputer 62s and the monitoring microcomputer 64s are included in the electronic control device 60 in FIG. 9, and the main microcomputer 62s and the monitoring microcomputer 64s correspond to the first calculation processing portion of the present invention and the second calculation processing portion of the present invention, respectively. In FIG. 9, the input accepting portions 66s and 68s receive input of an electric signal, i.e., an input signal, from the shift operation device 30 and the input accepting portion 66s and 68s obtain from the input signal the shift position Psh indicated by the input signal as the input value. In other words, the input value of the main microcomputer 62s and the monitoring microcomputer 64s is the shift position Psh selected in the shift operation device 30. For example, if the lever operation of the shift lever 32 is performed by a driver to the R-operation position, the input value turns to the R-position and, if the lever operation of the shift lever 32 is performed by a driver to the N-operation position, the input value turns to the N-position.

As described with regard to the main microcomputer 62 of FIG. 3, the main microcomputer 62s executes the intermediate processes and the fail-safe process for the input value acquired by the input accepting portion 66s and determines and outputs the final control value that is the calculation result based on the input value after these processes. The final control value is also referred to as a control shift in FIG. 9. When the main microcomputer 62s determines the control shift, for example, the shift control of the transmission 18 is provided in accordance with the control shift and the parking lock device 16 is operated. The control shift is set to any of the shift positions Psh selectable in the shift operation device 30, i.e., any of the R-, N-, D-, B-, and P-positions. Since the main microcomputer 62s provides the shift control, for example, the intermediate processes or the fail-safe process provided by the main microcomputer 62s may be that (i) when the current shift position Psh is other than the D-position, if the B-position is acquired as the input value, the control shift (final control value) is not set to the B-position and is allowed to remain at the current shift position Psh, that (ii) during high speed running at a predetermined vehicle speed or higher, when the current shift position Psh is the D-position, if the R-position is acquired as the input value, the control shift is determined as the N-position, that (iii) during high speed running at a predetermined vehicle speed or higher, when the current shift position Psh is the R-position, if the D-position is acquired as the input value, the control shift is determined as the N-position, and that (iv) if an input signal continuously input to the input accepting portions 66s and 68s is a signal that is impossible if electric circuits such as the shift operation device 30 are normal, the control shift is determined as the N-position.

The monitoring microcomputer 64s provides the abnormality detection control as described above for the monitoring microcomputer 64 of FIG. 3. Since the final control value of the main microcomputer 62s is used for the shift control, if the vehicle state acquired from the shift position Psh defined as the input value or the final control value is closer to the vehicle stop state, it is determined that the vehicle 10 is in a higher safety state. Therefore, as depicted in a vehicle safety state map of FIG. 10, among the R-, N-, D-, B-, P-positions, the P-position is the shift position Psh at which the highest safety state of the vehicle 10 is acquired. The N-position is the shift position Psh at which the next highest safety state of the vehicle 10 is acquired after the P-position. The N-position is the shift position Psh at which a higher safety state of the vehicle 10 is acquired as compared to the R-, D-, and B-positions, i.e., as compared to the running positions. Such a relationship between the height of the safety state of the vehicle 10 and the shift position Psh is predefined as the vehicle safety state map of FIG. 10 and stored in the monitoring microcomputer 64s. As can be seen from this vehicle safety state map, the highly safe state value of FIG. 9 is the P-position. From the vehicle safety state map of FIG. 10, the relationship of the input value of the monitoring microcomputer 64s, the control shift (final control value) of the main microcomputer 62s, and the satisfaction of the first to third conditions (see FIG. 4) can be represented by a map of FIG. 11. In FIG. 11, [1] . indicates that the first condition is satisfied; [2] . indicates that the second condition is satisfied; [3] . indicates that the third condition is satisfied; and a "cross mark" indicates that none of the first to third conditions is satisfied. Since both the D- and B-positions are the running positions causing the vehicle 10 to run forward, both the D- and B-positions are considered as the same shift position Psh in the abnormality detection control provided by the monitoring microcomputer 64s as can be seen from FIG. 11.

Since the vehicle safety state map of FIG. 10 is predefined as described above, the monitoring microcomputer 64s judges whether the main microcomputer 62s is abnormal from the vehicle safety state map in the abnormality detection control. As is the case with the description of FIG. 3, if the monitoring microcomputer 64s judges that the main microcomputer 62s is abnormal, the control shift (final control value) of the main microcomputer 62s is handled as an abnormal value in the shift control. The electronic control device 60 then executes a process predefined to be executed when the control shift is an abnormal value. For example, the electronic control device 60 executes a process of displaying the occurrence of abnormality at an easily viewable position for a driver in a vehicle interior or a process of promptly stopping the vehicle 10 if running.

In FIG. 9, the first determination pattern is specifically employed out of the first to fifth determination patterns depicted in FIGS. 4 to 8 in the abnormality detection control executed by the monitoring microcomputer 64s. This is because the abnormality detection control relates to the shift control. Therefore, the abnormality detection control portion 70s of the monitoring microcomputer 64s executes the flowchart depicted in FIG. 4 in the abnormality detection control. In particular, the abnormality detection control portion 70s makes a judgment on each of the first to third conditions described at SA1 to SA3 of FIG. 4 in accordance with the vehicle safety state map. If none of the first to third conditions is satisfied, the abnormality detection control portion 70s judges that the main microcomputer 62s is abnormal at SA4. of FIG. 4.

As described above, according to this example, the electronic control device 60 includes the main microcomputer 62, 62s that is the first calculation processing portion outputting a calculation result based on the input value, and the monitoring microcomputer 64, 64s that is the second calculation processing portion acquiring the same input value as the input value of the main microcomputer 62, 62s. The monitoring microcomputer 64, 64s detects an abnormality of the main microcomputer 62, 62s based on comparison between the input value of the monitoring microcomputer 64, 64s and the calculation result of the main microcomputer 62, 62s or based on whether the calculation result is the predefined highly safe state value at which the relatively high safety state of the vehicle 10 is acquired. Therefore, since the monitoring microcomputer 64, 64s does not need to have the same configuration as the main microcomputer 62, 62s for ensuring a reliability of the calculation result of the main microcomputer 62, 62s, a cost increase of the electronic control device 60 can be suppressed while the reliability of the calculation result of the main microcomputer 62, 62s is ensured even if the main microcomputer 62, 62s has a large-scale configuration.

According to this example, as depicted in the flowchart of FIG. 4, the monitoring microcomputer 64s judges that the main microcomputer 62s is abnormal if no condition is satisfied out of the first condition that the final control value (calculation result) of the main microcomputer 62s is equal to the input value of the monitoring microcomputer 64s, the second condition that the calculation result of the main microcomputer 62s is the highly safe state value, and the third condition that the calculation result of the main microcomputer 62s is a value at which a higher safety state of the vehicle 10 is acquired as compared to the input value of the monitoring microcomputer 64s. Therefore, the monitoring microcomputer 64s can determine whether the main microcomputer 62s is abnormal, under specific judgment criteria.

According to this example, the shift operation device 30 outputs the shift position Psh selected by a driver as an electric signal to the main microcomputer 62s and the monitoring microcomputer 64s. The input value of the main microcomputer 62s and the monitoring microcomputer 64s is the shift position Psh selected in the shift operation device 30 and the final control value (calculation result) of the main microcomputer 62s is set to any of the shift positions Psh (the R-, N-, D-, B-, and P-positions) selectable in the shift operation device 30. Therefore, a cost increase of the monitoring microcomputer 64s can be suppressed while preventing the impairment of the reliability of the calculation result of the main microcomputer 62s, i.e., a reliability of the shift control, in the shift control of recognizing the shift position Psh based on the electric signal from the shift operation device 30. In short, the cost increase of the electronic control device 60 providing the shift control can be suppressed.

According to this example, the highly safe state value is predefined as the P-position (parking position). The N-position (neutral position) is predefined as the position at which a higher safety state of the vehicle 10 is acquired as compared to the R-, D-, and B-positions (running positions). Therefore, since the relationship between the height of the safety state of the vehicle 10 and the shift position Psh is predefined, the monitoring microcomputer 64s can easily determine whether the main microcomputer 62s is abnormal in accordance with the flowchart of FIG. 4.

Although the example of the present invention has been described in detail with reference to the drawings, the present invention is applicable in other forms.

For example, although the shift lever 32 is two-dimensionally shift-operated in the example, the shift lever 32 may be shift-operated along one axis or may be three-dimensionally shift-operated. Although the shift lever 32 returns to the M-operation position when the external force acting on the shift lever 32 disappears, the shift lever 32 may be formed such that the shift lever stays at the operation position Pope in accordance with the operation of a driver without returning to the M-operation position.

Although the shift sensor 36 and the select sensor 38 are included as the position sensors detecting the position of the shift lever 32 in the example, the number of the position sensors is not limited to two.

Although the shift lever 32 is a momentary lever switch in the example, the shift lever 32 may be replaced with, for example, a push-button switch or a sliding switch. Additionally, the shift operation device 30 may be shift-operated by a foot instead of being operated by hand, or may be shift-operated in response to voice of a driver. In short, the shift operation device 30 may be any operation device converting an intention of shifting of a driver into an electric signal.

Although the vehicle safety state map is exemplarily illustrated in FIG. 10 in the example, the vehicle safety state map may be switched depending on a vehicle state such as whether the vehicle 10 is stopped, decelerated, or running at high speed.

Although the input accepting portions 66, 68, 66s, and 68s obtain from the input signal the input value indicated by the input signal in the example, if the input signal itself is abnormal, a predetermined fail-safe process may be executed. For example, if either the main shift sensor or the sub-shift sensor is abnormal or if either the main select sensor or the sub-select sensor is abnormal in FIG. 9, the input accepting portions 66s and 68s may obtain the input value based on the input signal from the other sensor.

The above description is merely an embodiment and the present invention may be implemented in variously modified and improved forms based on the knowledge of those skilled in the art.

NOMENCLATURE OF ELEMENTS

10: vehicle
14: drive wheels
30: shift operation device
60: electronic control device (vehicle control device)
62, 62s: main microcomputer (first calculation processing portion)
64, 64s: monitoring microcomputer (second calculation processing portion)

The invention claimed is:
1. A control device for a vehicle, comprising:
a first processor configured to output a result of a calculation that is made based on an input value that is inputted to the first processor;
a second processor configured to acquire the same input value as the input value inputted to the first processor; and
a non-transitory memory module storing a computer readable program, wherein
the program, when executed by the first processor, causes the first processor to:
acquire the input value,
make the calculation based on the input value, and
output the result of the calculation, wherein the result of the calculation is used for a control related to running of the vehicle, and
the program, when executed by the second processor, causes the second processor to:
acquire the same input value, and
detect an abnormality of the first processor based on a comparison between the input value acquired by the second processor and the result of the calculation outputted by the first processor or based on whether the result of the calculation is a predefined highly safe state value at which a relatively high safety state of a vehicle is acquired.

2. The control device of claim 1, wherein the program, when executed by the second processor, further causes the second processor to judge that the first processor is abnormal if any one of three conditions is not satisfied, the three conditions consisting of a condition that the result of the calculation outputted by the first processor is equal to the input value acquired by the second processor, a condition that the result of the calculation outputted by the first processor is the highly safe state value, and a condition that the result of the calculation outputted by the first processor is a value at which a higher safety state of the vehicle is acquired as compared to the input value acquired by the second processor.

3. The control device of claim 2, wherein
the vehicle includes a shift operation device that is configured to output an electrical signal indicative of one of shift positions that is selected by a driver of the vehicle, to the first processor and the second processor,
the input value acquired by the first processor and the second processor is the one of the shift positions that is selected in the shift operation device, and
the result of the calculation outputted by the first processor is set to any of the shift positions selectable in the shift operation device.

4. The control device of claim 3, wherein
the shift positions selectable in the shift operation device include a parking position at which power transmission to drive wheels is interrupted while the drive wheels are fixed, a neutral position at which the power transmission to the drive wheels is interrupted while the drive wheels are allowed to rotate, and a running position at which the vehicle is allowed to run forward or backward,
the highly safe state value is predefined as the parking position, and
the neutral position is predefined as a position at which a higher safety state of the vehicle is acquired as compared to the running position.

5. The control device of claim 1, wherein
the input value acquired by the first and second processors is based on an operation of a driver of the vehicle.

6. The control device according to claim 1, wherein
each of a plurality of values is to be inputted as the input value and is to be outputted as the result of the calculation, the second processor is configured to store data indicating association of each of the plurality of values with a level of a safety sate of the vehicle that is established by the each of the values, and the second processor is configured to detect the abnormality of the first processor, in accordance with the stored data.

7. The control device according to claim 6, wherein the program, when executed by the second processor, further causes the second processor to judge that the first processor is abnormal if one of the values outputted as the result of the calculation is lower than one of the values inputted as the input value in terms of the level of the safety state.

* * * * *